Feb. 13, 1934. L. LOOMIS 1,946,980
APPARATUS FOR SEGREGATING EGGS
Filed Dec. 28, 1931
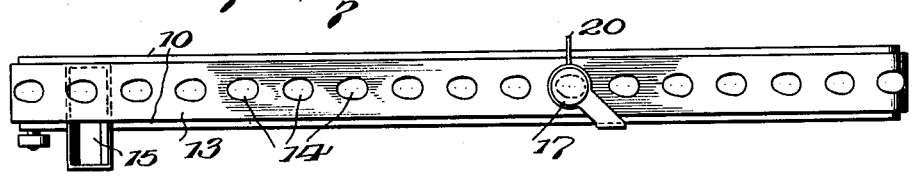
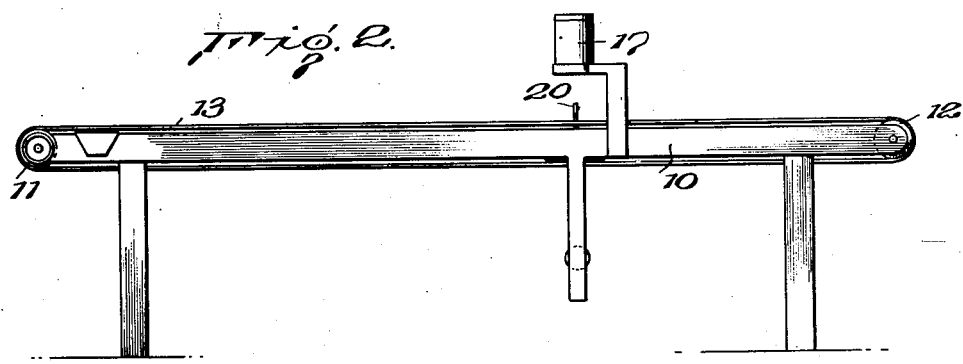
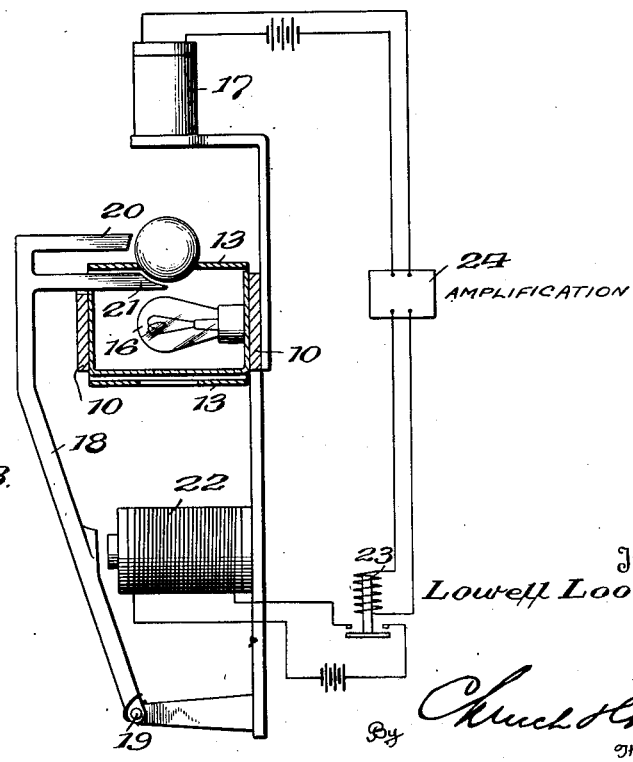
Inventor
Lowell Loomis,
By Church & Church
His Attorneys Patented Feb. 13, 1934

1,946,980

UNITED STATES PATENT OFFICE 1,946,980

APPARATUS FOR SEGREGATING EGGS

Lowell Loomis, Oakland, Md.

Application December 28, 1931
Serial No. 583,558

2 Claims. (Cl. 209—111)

This invention relates to improvements in segregating eggs, depending upon their translucency.

The segregation of eggs which may be either candling, sorting or grading for any purpose, such as marketability or hatchability, is effected, in the present method, by means responsive to the translucency or transparency of the egg.

More particularly, the invention contemplates an apparatus through which a continuous line of eggs can be passed, the "good" eggs, so to speak, remaining on the conveyor on which the eggs are carried, and the "bad" eggs automatically removed from said conveyor by means whose operation is controlled by instrumentalities responsive to the translucency or transparency of the egg.

With these and other objects in view, the invention consists in certain details of construction and combinations and arrangements of parts, all as will hereinafter be more fully described, and the novel features thereof particularly pointed out in the appended claims.

In the accompanying drawing,

Figure 1 is a plan view, showing the preferred form of apparatus, more or less diagrammatically; and Fig. 2 is a side elevation.

Fig. 3 is a cross sectional elevation on a larger scale.

In a preferred form of apparatus for carrying out the present method, there is a table or stand 10, having journaled therein, at its ends, rollers 11, 12, over which passes a continuous belt 13. The belt is provided with a longitudinally extending series of openings 14, each adapted to receive an egg to be tested or candled. The openings 14 are preferably of some fixed desired size and beneath the belt, at one end, there is a pocket 15, into which eggs smaller in size than the openings 14, will drop and from which they can be removed in any desired way. The belt 13 is adapted to travel on the rollers 11, 12, by having roller 11 driven from some suitable source of power.

At any desired point along the belt, between rollers 11, 12, there is located, beneath the upper reach of the belt, where the belt is horizontally disposed, a source of light, indicated at 16 and positioned above said belt in alinement with said source of light, is an instrument responsive to light rays, such as a selenium cell 17. At the side of the conveyor belt, substantially in alinement with said source of light and the selenium cell, there is a kick-off mechanism, consisting essentially of a vertical arm 18, pivoted at its lower end at 19, and provided at its upper extremity with laterally projecting fingers 20, 21. Finger 21 extends beneath the upper reach of belt 13, and is somewhat longer than finger 20 which projects over the upper surface of said belt, so that when the kick-off is rocked on its pivot, the lower finger 21 will raise an egg out of the opening in the belt and the upper finger 20 will then displace the egg laterally from the belt. In order that unusable eggs may be ejected from the belt by this kick-off mechanism, arm 18 has positioned adjacent thereto, an electro-magnet 22 which is in circuit with a relay 23 and said relay is, in turn, electrically connected with the selenium cell 17. Interposed between the relay and selenium cell is an amplifier 24 for amplification of differences in the conductivity of the selenium cell. With this arrangement, so long as eggs passing between the source of light 16 and selenium cell 17 are of the proper translucency, the conductivity of the selenium cell will be substantially constant with the result that relay 23 will be inactive and that electro-magnet 22 will not be energized. However, in the event an unusable egg is positioned between the source of light 16 and cell 17, the light rays emanating from the source of light cannot be projected through the bad egg, because the latter is substantially opaque. Therefore, in the absence of light rays reaching the cell 17, the conductivity of the latter is reduced and this reduction in conductivity is amplified to an extent such as will affect relay 23 and render electro-magnet 22 operative with the result that kick-off arm 18 is rocked on its pivotal center and the egg, which has thus interrupted the light rays from the source of light, will be removed from the traveling belt.

While a selenium cell has been found most useful in the present apparatus, it will be understood that elements of a like nature or substantially the equivalents of a selenium cell may be substituted for the cell. For instance, photo-electric cells may be substituted. It will also be understood that more than one belt carrying a single row of eggs may be utilized. For instance, where the eggs are being tested preparatory to being placed in crates for marketing, as many rows of eggs as there are rows in the crate may be passed along simultaneously on one or more belts. Likewise, where the eggs are being tested for hatchability, as many rows as there are rows in the incubator trays will be passed through the apparatus. Therefore, broadly speaking, the present method contemplates the sorting or testing of eggs by passing them through, between an alined source of light and a light sensitive element, whereby the latter will be affected in the absence of light rays passing through an undesirable egg and there effect, through suitable instrumentalities, the actual rejection of the undesirable egg. It will also be appreciated that the light sensitive element need not necessarily be one whose conductivity is increased by being subjected to stronger light rays.

What I claim is:

1. In an apparatus for segregating eggs dependent upon their translucency, a carrier having a series of recesses therein in which a series of eggs are supported, a selenium cell and an alined source of light adjacent opposite surfaces of the carrier, means for moving said carrier to pass eggs thereon between said cell and light, and means engageable with eggs above and below the carrier for removing from said carrier eggs through which insufficient light rays pass to maintain the normal conductivity of said cell.

2. In an apparatus for segregating eggs dependent upon their translucency, a carrier having a series of apertures therein in which a series of eggs are supported, a selenium cell and an alined source of light adjacent opposite surfaces of the carrier, means for moving said carrier to pass eggs thereon between said cell and light, and means movable to engage eggs above and below the carrier for removing from said carrier eggs through which insufficient light rays pass to maintain the normal conductivity of said cell, the operation of said last mentioned means being controlled by said cell.

LOWELL LOOMIS.